(12) United States Patent
Chang et al.

(10) Patent No.: US 12,056,801 B2
(45) Date of Patent: Aug. 6, 2024

(54) METHOD FOR COLORING A TARGET IMAGE, AND DEVICE AND COMPUTER PROGRAM THEREFOR

(71) Applicant: NAVER WEBTOON LTD., Seongnam-si (KR)

(72) Inventors: Jaehyuk Chang, Seongnam-si (KR); Sungmin Kang, Seongnam-si (KR); Gayoung Lee, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 292 days.

(21) Appl. No.: 17/464,899

(22) Filed: Sep. 2, 2021

(65) Prior Publication Data
US 2021/0398331 A1    Dec. 23, 2021

Related U.S. Application Data

(63) Continuation of application No. PCT/KR2020/002992, filed on Mar. 3, 2020.

(30) Foreign Application Priority Data

Mar. 5, 2019  (KR) .................. 10-2019-0025357

(51) Int. Cl.
*G06T 11/40* (2006.01)
*G06N 3/045* (2023.01)
(Continued)

(52) U.S. Cl.
CPC ............. *G06T 11/40* (2013.01); *G06N 3/045* (2023.01); *G06T 7/11* (2017.01); *G06T 7/90* (2017.01);
(Continued)

(58) Field of Classification Search
CPC ....................................................... G06T 11/40
See application file for complete search history.

(56) References Cited

U.S. PATENT DOCUMENTS 10,997,752 B1*  5/2021 Yoo ..................... G06T 11/00
2019/0236813 A1*  8/2019 Yonetsuji ............... G06N 20/00
(Continued)

FOREIGN PATENT DOCUMENTS

| KR | 1020010084996 A | 9/2001 |
| KR | 100478767 B1 | 3/2005 |
| KR | 101676575 B1 | 11/2016 |

OTHER PUBLICATIONS

Richard Zhang et al.; Real-Time User-Guided Image Colorization with Learned Deep Priors; ACM Transactions on Graphics; https://doi.org/http://dx.doi.org/10.1145/3072959.3073703; May 8, 2017; pp. 1-11.

(Continued)

*Primary Examiner* — Shivang I Patel
(74) *Attorney, Agent, or Firm* — Greer Burns & Crain Ltd.

(57) ABSTRACT

A method of coloring a target image includes generating at least one target mask including a part of the target image by using a first artificial neural network, which has been trained; generating at least one reference mask that corresponds to the at least one target mask and includes at least part of a reference image, by using the first artificial neural network; generating at least one colored target mask by coloring the at least one target mask in reference to the color of the at least one reference mask; and generating a colored target image from the target image, the at least one target mask, and the at least one colored target mask by using a second artificial neural network, which has been trained.

21 Claims, 18 Drawing Sheets

(51) Int. Cl.
  *G06T 7/11* (2017.01)
  *G06T 7/90* (2017.01)
(52) U.S. Cl.
  CPC .............. *G06T 2207/20081* (2013.01); *G06T 2207/20084* (2013.01)

(56) References Cited

U.S. PATENT DOCUMENTS

2020/0098144 A1* 3/2020 Norouzi ................ G06T 11/001
2022/0301227 A1* 9/2022 Kanazawa ............ G06T 11/001

OTHER PUBLICATIONS

Raj Kumar Gupta et al.; Image Colorization Using Similar Images; MM'12; Oct. 29-Nov.2, 2012; pp. 360-378.
ISR issued in PCT/KR2020/002992, mailed Jul. 17, 2020.

* cited by examiner

METHOD FOR COLORING A TARGET IMAGE, AND DEVICE AND COMPUTER PROGRAM THEREFOR This is a continuation application of International Application No. PCT/KR2020/002992, filed Mar. 3, 2020, which claims the benefit of Korean Patent Application No. 10-2019-0025357, filed Mar. 5, 2019.

BACKGROUND OF THE INVENTION

Field of Invention

Example embodiments relate to a method, apparatus, and computer program for coloring a target image to be colored using a reference image.

Description of Related Art

With the spread of various smart devices including computers, services using an online network, particularly, those that provide content online are also on the increase. A webtoon service that provides cartoon content online is a representative example of such services.

Typically, a creator individually creates all the scenes to produce such cartoon content. However, a content creation speed according to this method does not keep up with an expansion speed of an online content market and an increase in the number of users accordingly, which acts as a factor that hinders a smooth content supply.

Accordingly, there is a need for a method of more efficiently creating webtoon content.

BRIEF SUMMARY OF THE INVENTION

Example embodiments of the present invention enable a user to more efficiently create online content.

In particular, example embodiments allow a user to reduce the amount of time for coloring and to create content within a shorter time in production of content that requires coloring by the user, such as a webtoon.

Also, example embodiments enable performing coloring which is more suitable to the needs of a user by performing automatic coloring of an image based on a provided reference image, and reducing work time required in making corrections by the user.

A method of coloring a target image to be colored using a reference image according to an example embodiment includes generating at least one target mask that includes a partial area of the target image using a trained first artificial neural network; generating at least one reference mask that corresponds to the at least one target mask, respectively, and includes at least partial area of the reference image using the first artificial neural network; generating at least one colored target mask by coloring each of the at least one target mask by referring to a color of the at least one reference mask; and generating a colored target image from the target image, the at least one target mask, and the at least one colored target mask using a trained second artificial neural network.

The first artificial neural network may be a neural network trained to segment the target image into at least one area based on a similarity of color to be used for coloring in each area and to generate the at least one target mask that includes each of the segmented at least one area.

The at least one target mask may include information regarding whether each of a plurality of points constituting the target image is included in each of at least one target mask.

The first artificial neural network may be a neural network trained to segment the reference image into at least one area based on a similarity of color to be used for coloring in each area and a shape similarity with an area included in the at least one target mask, and to generate the at least one reference mask that includes each of the segmented at least one area.

The at least one reference mask may include information regarding whether each of a plurality of points constituting the reference image is included in each of at least one reference mask.

The second artificial neural network may be a neural network trained to generate the colored target image from the at least one colored target mask by referring to the target image and the at least one target mask.

The second artificial neural network may be a neural network trained to generate the colored target image from the at least one colored target mask by referring to the target image and the at least one target mask and to generate the colored target image by applying a predetermined image effect to the at least one colored target mask.

The predetermined image effect may be an effect that causes a color difference between pixels included in each of the at least one colored target mask and adjacent pixels to be less than or equal to a predetermined threshold difference.

The generating of the colored target mask may include determining a representative color of an area included in a first reference mask according to a predetermined scheme; and generating the colored target mask by determining the representative color as a color of a target mask corresponding to the first reference mask.

The predetermined scheme may be a scheme of determining the average color of an area included in the first reference mask as the representative color.

An apparatus for coloring a target image to be colored using a reference image according to an example embodiment includes a processor. The processor is configured to generate at least one target mask that includes a partial area of the target image using a trained first artificial neural network, generate at least one reference mask that corresponds to the at least one target mask, respectively, and includes at least partial area of the reference image using the first artificial neural network, generate at least one colored target mask by coloring each of the at least one target mask by referring to a color of the at least one reference mask, and generate a colored target image from the target image, the at least one target mask, and the at least one colored target mask using a trained second artificial neural network.

The first artificial neural network may be a neural network trained to segment the target image into at least one area based on a similarity of color to be used for coloring in each area and to generate the at least one target mask that includes each of the segmented at least one area.

The at least one target mask may include information regarding whether each of a plurality of points constituting the target image is included in each of at least one target mask.

The first artificial neural network may be a neural network trained to segment the reference image into at least one area based on a similarity of color to be used for coloring in each area and a shape similarity with an area included in the at least one target mask and to generate the at least one reference mask that includes each of the segmented at least one area.

The at least one reference mask may include information regarding whether each of a plurality of points constituting the reference image is included in each of at least one reference mask.

The second artificial neural network may be a neural network trained to generate the colored target image from the at least one colored target mask by referring to the target image and the at least one target mask.

The second artificial neural network may be a neural network trained to generate the colored target image from the at least one colored target mask by referring to the target image and the at least one target mask and to generate the colored target image by applying a predetermined image effect to the at least one colored target mask.

The predetermined image effect may be an effect that causes a color difference between pixels included in each of the at least one colored target mask and adjacent pixels to be less than or equal to a predetermined threshold difference.

The processor may be configured to determine a representative color of an area included in a first reference mask according to a predetermined scheme, and to generate the colored target mask by determining the representative color as a color of a target mask corresponding to the first reference mask.

The predetermined scheme may be a scheme of determining the average color of an area included in the first reference mask as the representative color.

According to example embodiments, it is possible to more efficiently create online content. In particular, it is possible for a user to reduce the amount of time for coloring and to create content within a shorter time in production of content that requires coloring by the user, such as a webtoon.

Also, it is possible to perform coloring which is more suitable to the needs of a user by performing automatic coloring of an image based on a provided reference image, and to reduce work time required in making corrections by the user.

DETAILED DESCRIPTION OF THE INVENTION

Figure 1:
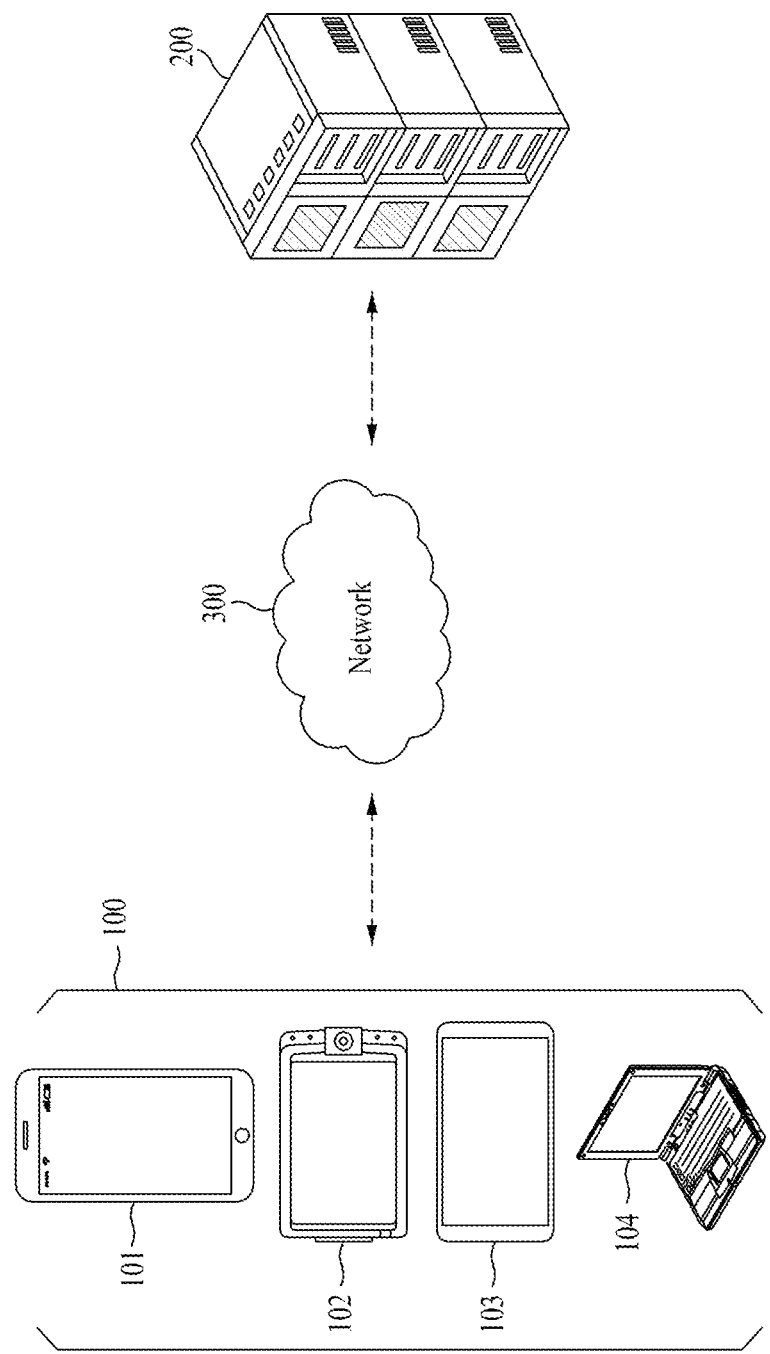
FIG. 1 illustrates an example of a network environment according to an example embodiment.

The following description related to the disclosure is made with reference to the accompanying drawings in which specific embodiments capable of implementing the disclosure are illustrated as examples. The example embodiments are fully explained such that those skilled in the art may implement the disclosure. It should be understood that various example embodiments differ from each other, but should not be mutually exclusive. For example, specific shapes, structures, and features described herein may be changed from one example embodiment to another example embodiment and thereby implemented without departing from the spirit and scope of the disclosure. Also, it should be understood that a position or an arrangement of each individual component in each example embodiment may be modified without departing from the spirit and scope of the disclosure. Therefore, the following detailed description is not construed as limiting and the scope of the disclosure should be understood to include the scope of the claims and the equivalents thereof. Like reference numerals in the drawings refer to identical or like elements across a plurality of aspects.

Hereinafter, various example embodiments are described in detail with reference to the accompanying drawings such that those skilled in the art may easily carry out the disclosure.

FIG. 1 illustrates a network environment according to an example embodiment. The network environment of FIG. 1 includes a plurality of user terminals 101, 102, 103, and 104, a server 200, and a network 300. FIG. 1 is provided as an example only to describe the disclosure and thus, the number of the user terminals 101, 102, 103, and 104 or the number of servers 200 is not limited to that which is shown in FIG. 1.

According to an example embodiment, the plurality of user terminals 101, 102, 103, and 104 may transmit, to the server 200, a target image desired to be colored according to the manipulation of a user and a reference image to be referenced for coloring the target image, and may receive a colored target image from the server 200.

According to another example embodiment, the plurality of user terminals 101, 102, 103, and 104 may determine a target image desired to be colored according to the manipulation of the user and a reference image to be referenced for coloring the target image, and may also color the target image.

Each of the plurality of user terminals 101, 102, 103, and 104 may be a fixed terminal or a mobile terminal configured as a computer apparatus. For example, the plurality of user terminals 101, 102, 103, and 104 may include a smartphone, a mobile phone, a navigation device, a computer, a laptop computer, a digital broadcasting terminal, personal digital assistants (PDA), a portable multimedia player (PMP), and a tablet PC.

The plurality of user terminals 101, 102, 103, and 104 may communicate mutually between the plurality of user terminals 101, 102, 103, and 104 and/or with the server 200 through the network 300 in a wireless or wired communication manner.

The communication scheme of the plurality of user terminals 101, 102, 103, and 104 is not limited and may also include a near field communication between devices as well as a communication scheme that uses a communication network (e.g., a mobile communication network, wired Internet, wireless Internet, and a broadcasting network) includable in the network 300.

For example, the network 300 may include at least one of a personal area network (PAN), a local area network (LAN), a campus area network (CAN), a metropolitan area network (MAN), a wide area network (WAN), a broadband network (BBN), and the Internet.

Also, the network 300 may include at least one of network topologies that may include a bus network, a star network, a ring network, a mesh network, a star-bus network, a tree or hierarchical network, and the like. However, these are only examples and the example embodiments are not limited thereto.

For clarity of description, the following description is made by referring to the plurality of user terminals 101, 102, 103, and 104 as a user terminal 100.

The server 200 may receive, from the user terminal 100, a target image desired to be colored and a reference image to be referenced for coloring the target image, and may color the target image using trained artificial neural networks. Further description related thereto is made below. The server 200 may be implemented as a computer apparatus or a plurality of computer apparatuses that provides instructions, codes, files, contents, services, and the like to the user terminal 100 over the network 300.

Figure 2:
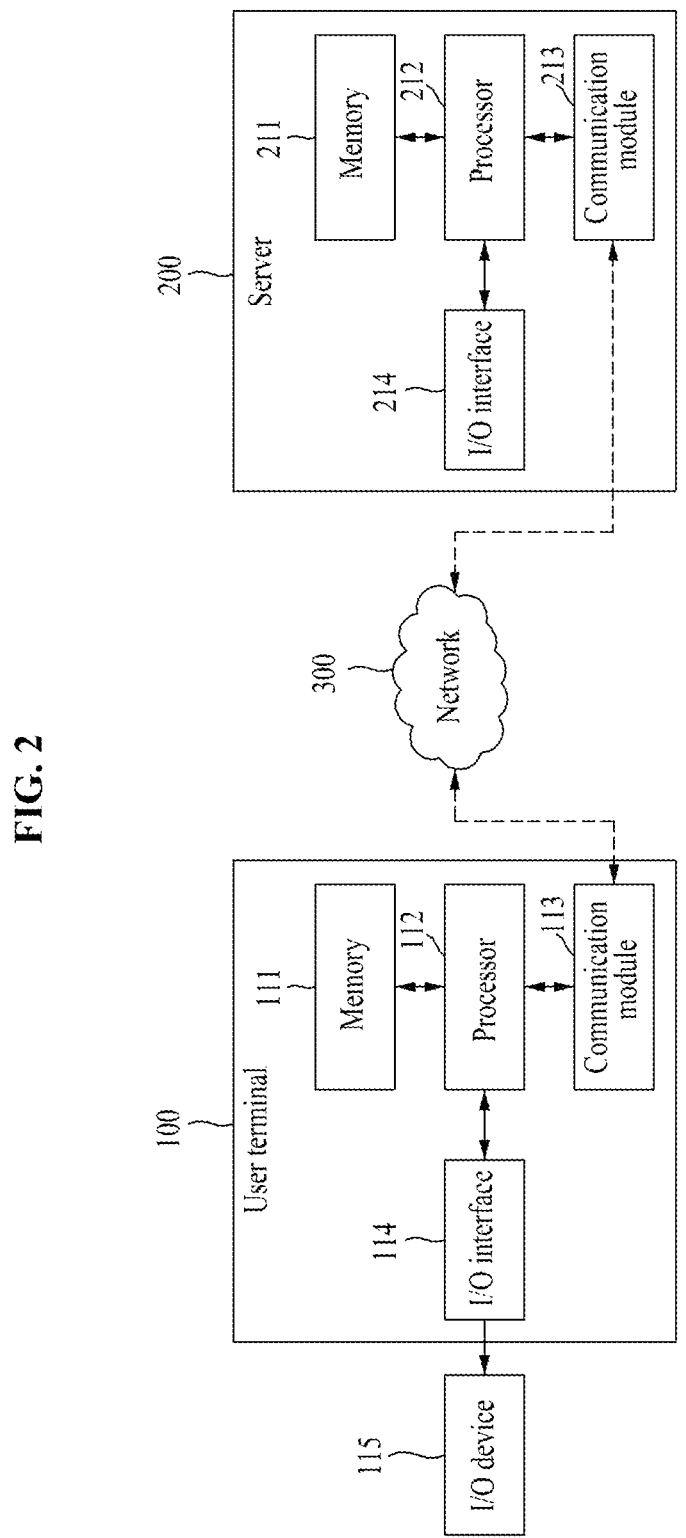
FIG. 2 is a block diagram illustrating an internal configuration of a user terminal and a server according to an example embodiment.

FIG. 2 is a block diagram illustrating the internal configuration of the user terminal 100 and the server 200 according to an example embodiment.

The user terminal 100 may include a memory 111, a processor 112, a communication module 113, and an input/output (I/O) interface 114, and the server 200 may include a memory 211, a processor 212, a communication module 213, and an I/O interface 214.

The memory 111, 211 may include a permanent mass storage device, such as a random access memory (RAM), a read only memory (ROM), and a disk drive, as a computer-readable storage medium.

Also, an operating system (OS) and at least one program code (e.g., a code for a program installed on the user terminal 100 and configured to color an image through data transmission and reception with the server 200) may be stored in the memory 111, 211.

Such software example components may be loaded from another computer-readable storage medium (not shown) separate from the memory 111, 211 using a drive mechanism. The other computer-readable storage medium may include a computer-readable storage medium, for example, a floppy drive, a disk, a tape, a DVD/CD-ROM drive, a memory card, etc.

According to other example embodiments, software components may be loaded to the memory 111, 211 through the communication module 113, 213, instead of the computer-readable storage medium. For example, at least one program may be loaded to the memory 111, 221 based on a program installed by files provided over the network 300 from developers or a file distribution system (e.g., the server 200) that provides an installation file of an application.

The processor 112, 212 may be configured to process computer-readable instructions of a computer program by performing basic arithmetic operations, logic operations, and I/O operations. The computer-readable instructions may be provided from the memory 111, 211 or the communication module 113, 213 to the processor 112, 212. For example, the processor 112, 212 may be configured to execute received instructions in response to the program code stored in the storage device, such as the memory 111, 211.

The communication module 113, 213 may provide a function for communication between the user terminal 100 and the server 200 over the network 300, and may provide a function for communication with another user terminal (not shown) or another server (not shown). For example, the processor 112 of the user terminal 100 may transfer a request created based on a program code stored in the storage device, such as the memory 111, to the server 200 over the network 300 under control of the communication module 113. Inversely, a control signal, an instruction, content, a file, etc., provided under control of the processor 212 of the server 200 may be received at the user terminal 100 through the communication module 113 of the user terminal 100 by going through the communication module 213 and the network 300.

The I/O interface 114, 214 may be a device for interfacing with an I/O device 115. For example, an input device may include a device, such as a keyboard and a mouse, and an output device may include a device, such as a display for displaying an image. As another example, the I/O interface 114, 214 may be a device for interfacing with an apparatus in which an input function and an output function are integrated into a single function, such as a touchscreen.

According to other example embodiments, the user terminal 100 and the server 200 may include a number of components greater than the number of components shown in FIG. 2. For example, the user terminal 100 may include at least a portion of the I/O device 115, or may further include other components, for example, a transceiver, a global positioning system (GPS) module, a camera, a variety of sensors, a database (DB), and the like.

The processor 212 of the server 200 according to an example embodiment may color a target image using trained artificial neural networks.

The term "target image" used herein refers to an image of which coloring is to be completed and may be an image in which coloring of at least partial area is not completed (i.e., without coloring information about at least partial area). Here, the term "area" may represent a portion of an image that is segmented by an outline and the like in the image.

The term "reference image" used herein refers to an image to be referenced for coloring the aforementioned target image and an image of which coloring is completed. The reference image may be obtained with the target image and used for coloring the target image.

According to an example embodiment, the reference image may be provided from the user. That is, the user may provide the reference image colored with a desired style (i.e., a desired color combination) with the target image, such that the target image may be colored in a similar style to that of the reference image.

According to another example embodiment, the reference image may be provided from the processor 212 in the server 200 based on a predetermined image analysis result. In this case, the processor 212 may select a single candidate reference image from among a plurality of candidate reference images as the reference image based on a similarity of shape between the plurality of candidate reference images and the target image (i.e., a similarity of shape of at least one area constituting the image). In this case, the user may provide only the target image and may obtain a colored target image.

The term "mask" such as a "target mask" and a "reference mask" used herein refers to an image that includes at least partial area of an original image (e.g., the reference image or the target image) and may refer to an image that includes information regarding whether each of a plurality of points constituting the original image is included in a corresponding mask. For example, a first target mask generated from the target image may include information regarding whether each of a plurality of points constituting the target image is included in the first target mask, in the form of ground truth (i.e., 1 or 0). Likewise, a first reference mask generated from the reference image may include information regarding whether each of a plurality of points constituting the reference image is included in the first reference mask, in the form of ground truth (i.e., 1 or 0).

The term "colored mask" used herein may refer to an image in which color information is added to the aforementioned mask. For example, a "colored first target mask" in a form in which color information is added to the first target mask may refer to an image that includes information regarding whether each of the plurality of points constituting the target image is included in the first target mask in a form of ground truth (i.e., 1 or 0) and that further includes color information of an included area.

The term "artificial neural network" such as a first artificial neural network and a second artificial neural network used herein refers to a neural network appropriately trained based on its purpose and/or use and may be trained based on a machine learning technique or a deep learning technique.

The term "first artificial neural network" used herein may refer to a neural network trained to segment the target image into at least one area based on a similarity of color to be used for coloring in each area of the target image and to generate at least one target mask that includes each of the segmented at least one area, when an input image is the target image.

That is, the first artificial neural network, as a neural network trained to generate at least one mask by segmenting the input image into a plurality of areas, may generate a mask by segmenting the input image into a plurality of areas based on a similarity of color to be used for coloring.

When the input image is a reference image, the first artificial neural network may be a neural network trained to segment the reference image into at least one area based on a similarity of color to be used for coloring in each area of the reference image (here, the reference image is an outline image generated from the colored reference image) and a shape similarity with a partial area of the target image included in at least one target mask generated through the aforementioned process and to generate at least one reference mask that includes each of the segmented at least one area.

That is, similar to the target image, the first artificial neural network, as a neural network trained to generate at least one mask by segmenting the input image into a plurality of areas, may generate a mask by segmenting input image into a plurality of areas by referring to the similarity of color to be used for coloring and masks input.

The term "second artificial neural network" used herein may be a neural network trained to generate a colored target image from at least one colored target mask by referring to the target image to be colored and at least one target mask generated from the target image. Here, the second artificial neural network may be trained to generate the colored target image by applying a predetermined image effect to the at least one colored target mask. The colored target mask is further described below. Hereinafter, for clarity of description, the first artificial neural network and the second artificial neural network may be collectively referred to as the "artificial neural network".

Figure 3:
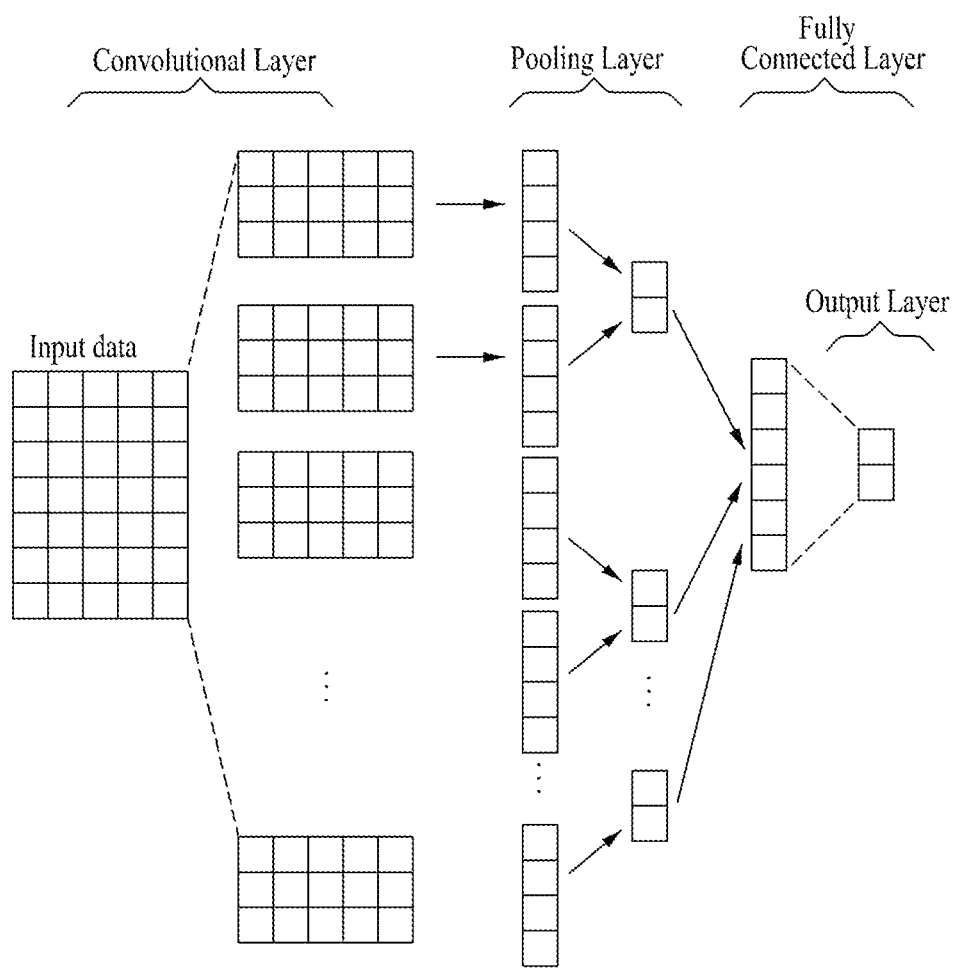
FIG. 3 illustrates a structure of an exemplary artificial neural network trained by a processor.

FIG. 3 illustrates a structure of an exemplary artificial neural network trained by the processor 212.

An artificial neural network according to an example embodiment may be a neural network according to a convolutional neural network (CNN) model. Here, the CNN model may be a hierarchical model used to finally extract features of input data by alternately performing a plurality of computational layers (e.g., a convolutional layer and a pooling layer).

With the assumption that a neural network model of FIG. 3 relates to a first artificial neural network, the processor 212 may generate a convolutional layer that extracts feature values of a target image included in learning data and a pooling layer that constitutes a feature map by combining the extracted feature values.

Also, the processor 212 may generate a fully connected layer that prepares generation of at least one target mask by combining the generated feature maps.

The processor 212 may obtain an output layer that includes at least one target mask.

In the example of FIG. 3, input data (e.g., the target image) of the convolutional layer is segmented into 5×7 blocks, 5×3 unit blocks are used to generate the convolutional layer, and 1×4 and 1×2 unit blocks are used to generate the pooling layer. However, it is provided as an example only and the spirit of the disclosure is not limited thereto. Accordingly, the size of an image block used to generate each layer may be variously set.

Also, FIG. 3 illustrates an example structure of the aforementioned first artificial neural network. The structure of the first artificial neural network may differ from that of FIG. 3 based on the type and/or the quantity of input data.

For example, the first artificial neural network may include a block for receiving at least one target mask in addition to a reference image as input data of the convolutional layer. Even in this case, the processor 212 may obtain as output data the output layer that includes at least one reference mask according to the aforementioned process.

A second artificial neural network may include, in the convolutional layer, a block for receiving the target image, at least one target mask generated from the corresponding target image, and at least one colored target mask. A block for outputting a colored target image may be included in the output layer.

Such an artificial neural network may be stored in the memory 211 in a form of coefficients of a function that defines a coefficient of at least one node constituting the artificial neural network, a weight of a node, and a relationship between a plurality of layers constituting the artificial neural network. Also, a structure of the artificial neural network may be stored in the memory 211 in a form of a source code and/or a program.

The processor 212 according to an example embodiment may construct or train a neural network model by processing learning data according to a supervised learning technique.

For example, in training the first artificial neural network, learning data may include the target image and at least one target mask generated from the corresponding target image.

The processor 212 may repeatedly train the first artificial neural network to learn a correspondence relationship between the target image and the at least one target mask generated from the target image based on the learning data.

That is, the processor 212 may train the first artificial neural network such that a feature about image segmentation may be applied using an original image and at least one mask generated by segmenting the original image. Therefore, the first artificial neural network may be trained to output the at least one target mask for an input of the target image.

Also, in training the first artificial neural network, learning data may include the reference image, at least one reference mask generated from the reference image, and at least one target mask referenced to generate the at least one reference mask.

In this case, the processor 212 may train the first artificial neural network to learn a correspondence relationship among the reference image and at least one target mask and at least one reference mask generated from the reference image.

That is, the processor 212 may further train the first artificial neural network such that a feature about image segmentation using reference information may be applied using the original image, information referenced for segmenting the original information, and at least one mask obtained by segmenting the original image. Therefore, the first artificial neural network may be trained to output at least one reference mask for an input of the reference image and at least one target mask. Even in this case, learning may be repeatedly performed.

In training the second artificial neural network, learning data may include the target image, at least one target mask generated from the target image, at least one colored target mask, and the colored target image.

Similar to training the first artificial neural network, the processor 212 may train the second artificial neural network to learn a correspondence relationship among the target image, at least one target mask generated from the target image, at least one colored target mask, and the colored target image. Therefore, the second artificial neural network may be trained to output the colored target image for an input of the target image, at least one target mask generated from the target image, and at least one colored target mask.

The expression "training" an artificial neural network used herein may represent updating coefficients of a function that defines a coefficient of at least one node constituting the artificial neural network, the weight of a node, and/or a relationship between a plurality of layers constituting the artificial neural network Although FIG. 3 is described based on an example in which the artificial neural network is a neural network according to a CNN model, it is provided as an example only and the neural network model is not limited thereto. Therefore, the artificial neural network may be a neural network according to various types of neural network models.

Hereinafter, with the assumption that the aforementioned artificial neural network is trained by the processor 212, a method, by the processor 212, of coloring the target image is described.

The processor 212 according to an example embodiment may obtain a target image to be colored. For example, the processor 212 may receive the target image from the user terminal 100 or may extract the target image from the memory 211 in the server 200.

Here, the processor 212 according to an example embodiment may also obtain a reference image to be referenced for coloring the target image. Also, the reference image may be obtained from the user terminal 100 or may be extracted from the memory 211.

Figure 4:
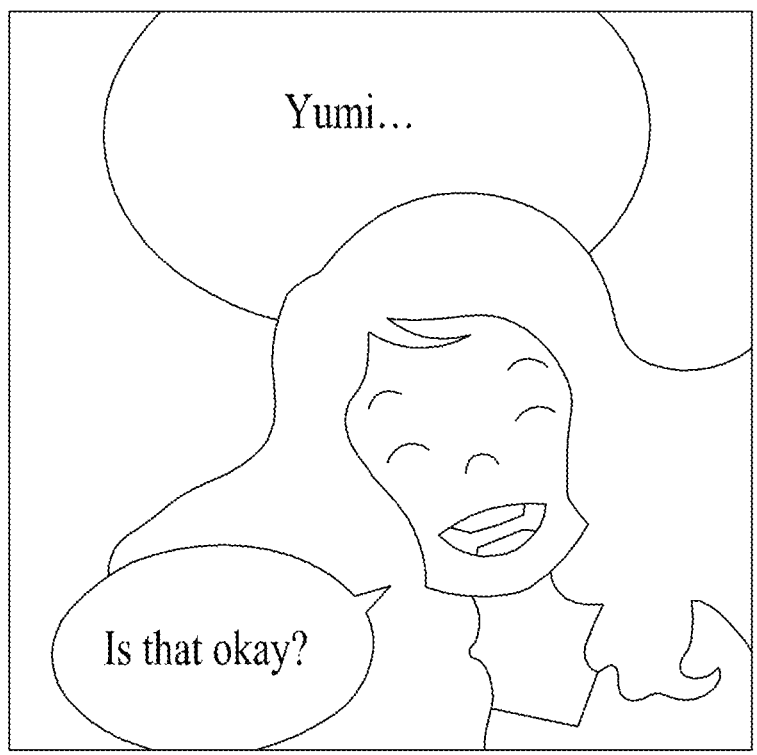
FIG. 4 illustrates an example of a target image.

FIG. 4 illustrates an example of a target image.

As described above, the term "target image" used herein refers to an image of which coloring is to be completed and may be an image in which coloring of at least partial area is not completed.

Referring to FIG. 4, the target image may be a single scene (or a single cut) of a cartoon and may be various types of images, such as a poster and an illustration. Hereinafter, for clarity of description, a description is made based on the assumption that the image of FIG. 4 is used as the target image.

The processor 212 according to an example embodiment may generate at least one target mask that includes a partial area of the target image obtained using a trained first artificial neural network.

As described above, the first artificial neural network may be an artificial neural network trained to learn a feature about image segmentation using an original image and at least one mask obtained by segmenting the original image. Therefore, the processor 212 may generate at least one target mask from the target image using the first artificial neural network. That is, the processor 212 may obtain at least one target mask as an output by inputting the target image to the first artificial neural network.

FIGS. 5A to 5D illustrate examples of a target mask generated from the target image of FIG. 4 by the processor 212 according to an example embodiment.

Figure 5A:
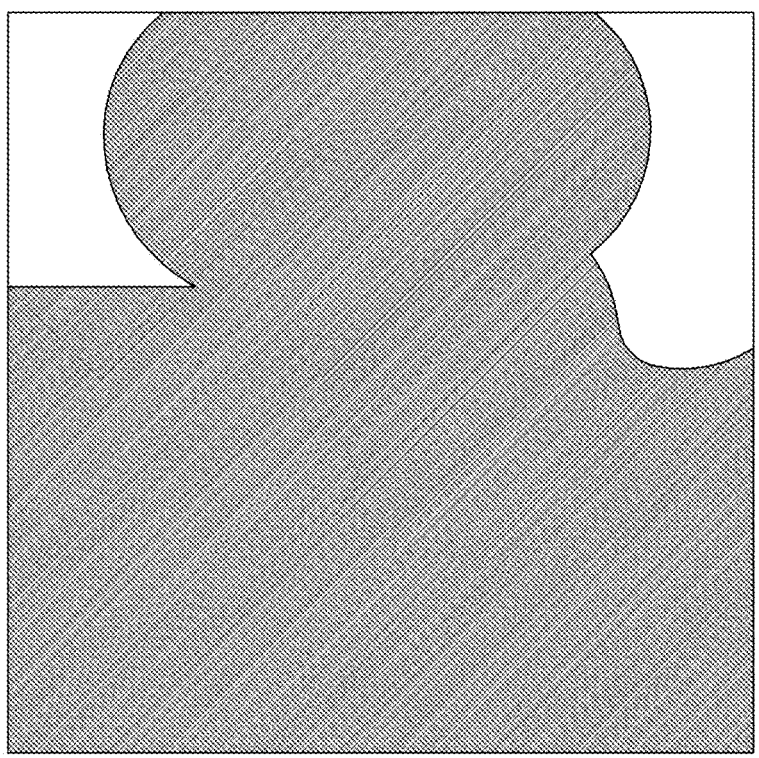
FIG. 5A illustrates an example of a target mask generated from the target image of FIG. 4 by the processor of FIG. 2 according to an example embodiment.

For example, the processor 212 according to an example embodiment may generate a first target mask that includes an upper area of a background as illustrated in FIG. 5A from the target image of FIG. 4.

Since the first artificial neural network generates a target mask based on a similarity of color to be used for coloring, areas included in a single target mask correspond to areas that may be colored with similar colors. Therefore, an area included in the mask of FIG. 5A (i.e., an area indicated in white) may correspond to an area that may be colored with a single color or a color similar thereto.

Figure 5B:
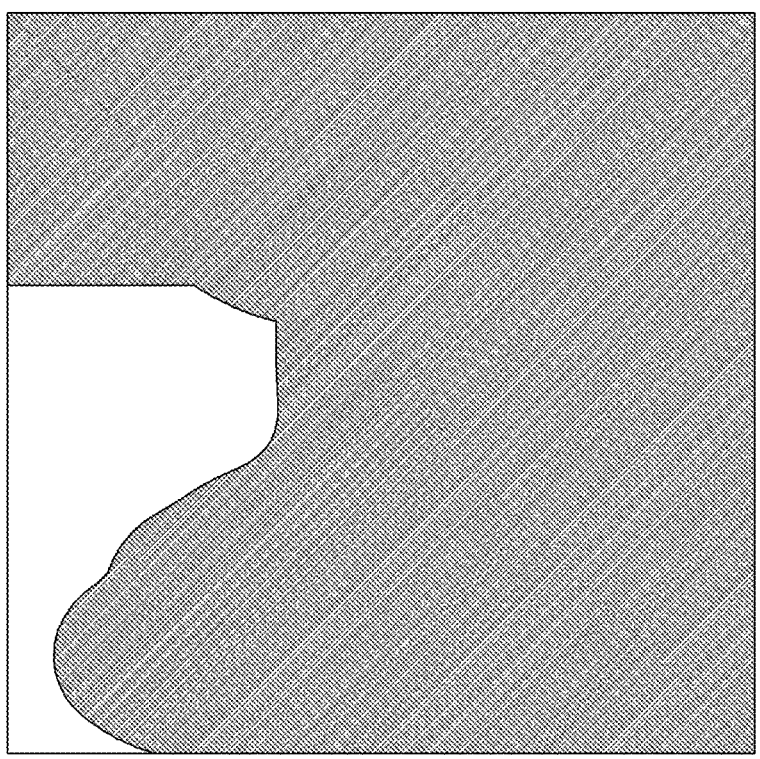
FIG. 5B illustrates an example of another target mask generated from the target image of FIG. 4 by the processor of FIG. 2 according to an example embodiment.

Likewise, the processor 212 according to an example embodiment may generate, from the target image of FIG. 4, a second target mask that includes a lower area of the background as illustrated in FIG. 5B, a third target mask that includes a speech bubble area, and a fourth target mask that includes a hair area. Similar to the aforementioned first target mask, areas included on each mask may correspond to areas that may be colored with similar colors.

The target masks of FIGS. 5A to 5D are provided as an example only and the number of target masks and the detailed shapes thereof are not limited thereto. Accordingly, in addition to the target masks described in FIGS. 5A to 5D, the processor 212 may further generate a mask that includes a facial area and a mask that includes a torso area.

The processor 212 according to an example embodiment may generate at least one reference mask that, respectively, corresponds to at least one target mask generated through the aforementioned process and includes at least a partial area of the obtained reference image, using the trained first artificial neural network.

As described above, the first artificial neural network refers to a neural network trained to generate at least one mask by segmenting an input image into a plurality of areas and may be a neural network trained to generate a mask by segmenting the input image into the plurality of areas by referring to input masks (i.e., input target masks) as well as a similarity of color to be used for coloring. Therefore, the processor 212 may generate at least one reference mask from a reference image and at least one target mask using the first artificial neural network. That is, the processor 212 may obtain at least one reference mask as an output by inputting the reference image and at least one target mask to the first artificial neural network.

Figure 6:
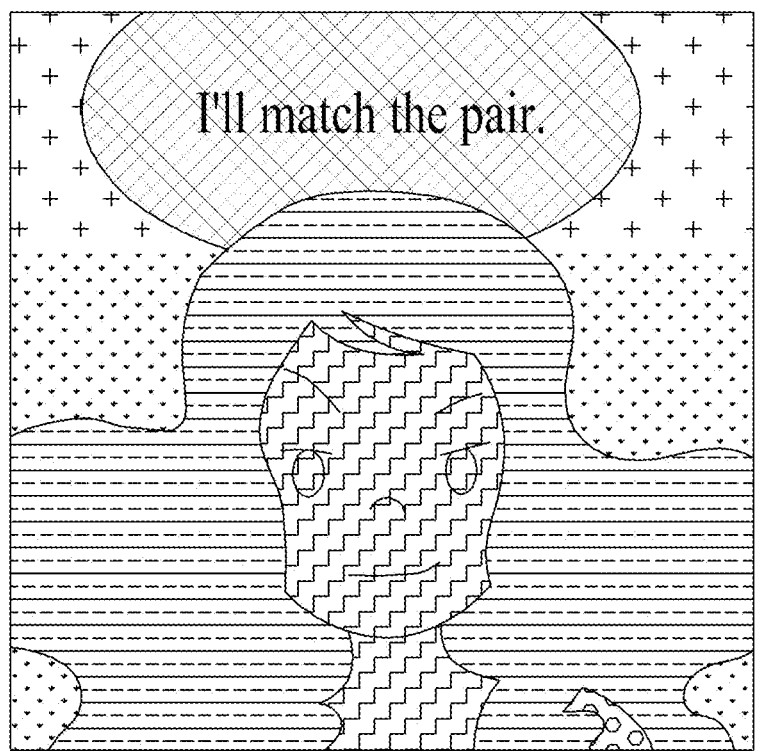
FIG. 6 illustrates an example of a reference image.

FIG. 6 illustrates an example of a reference image. FIGS. 7A to 7D illustrate examples of a reference mask generated from the reference image of FIG. 6 by the processor 212.

Figure 7A:
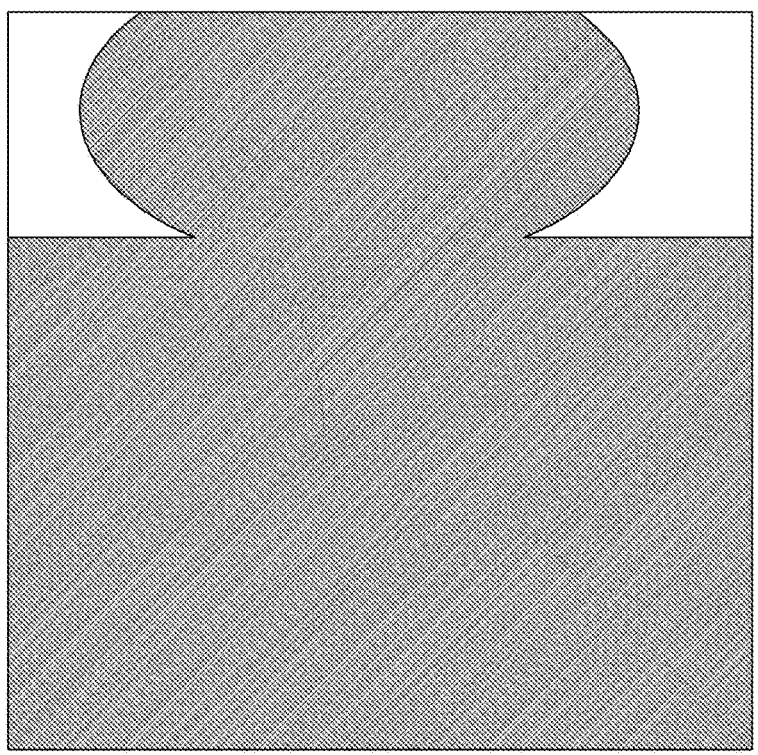
FIG. 7A illustrates an example of a reference mask generated from the reference image of FIG. 6 by the processor of FIG. 2.

The processor 212 according to an example embodiment may generate a first reference mask that includes an upper area of a background as illustrated in FIG. 7A from the reference image of FIG. 6 by referring to the target mask of FIG. 5A that includes an upper background area of the target image (FIG. 4).

Figure 7B:
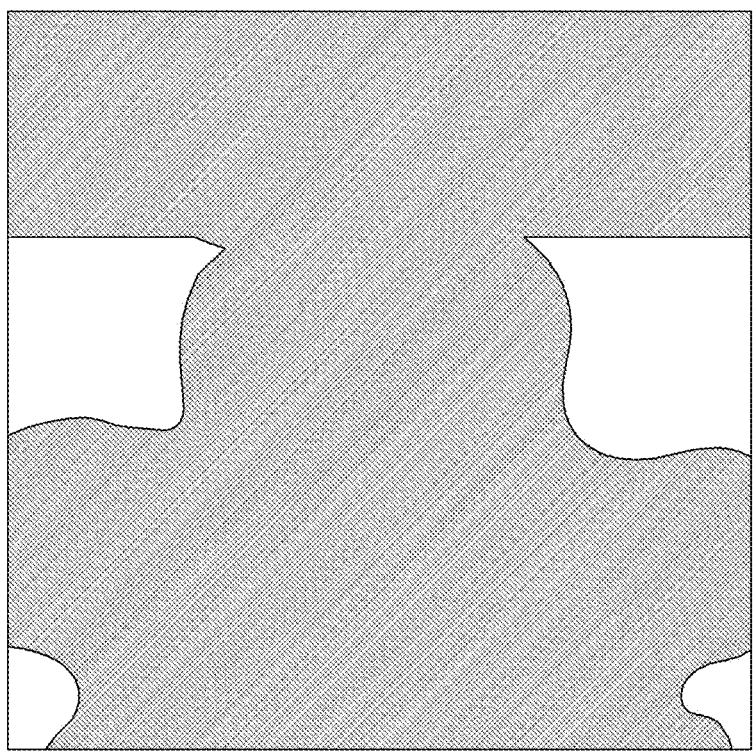
FIG. 7B illustrates an example of another reference mask generated from the reference image of FIG. 6 by the processor of FIG. 2.

Likewise, referring to FIG. 7B, the processor 212 may generate a second reference mask that includes a lower area of the background from the reference image of FIG. 6 by referring to the target mask of FIG. 5B that includes the lower area of the background.

Figure 5C:
FIG. 5C illustrates an example of still another target mask generated from the target image of FIG. 4 by the processor of FIG. 2 according to an example embodiment.
Figure 5D:
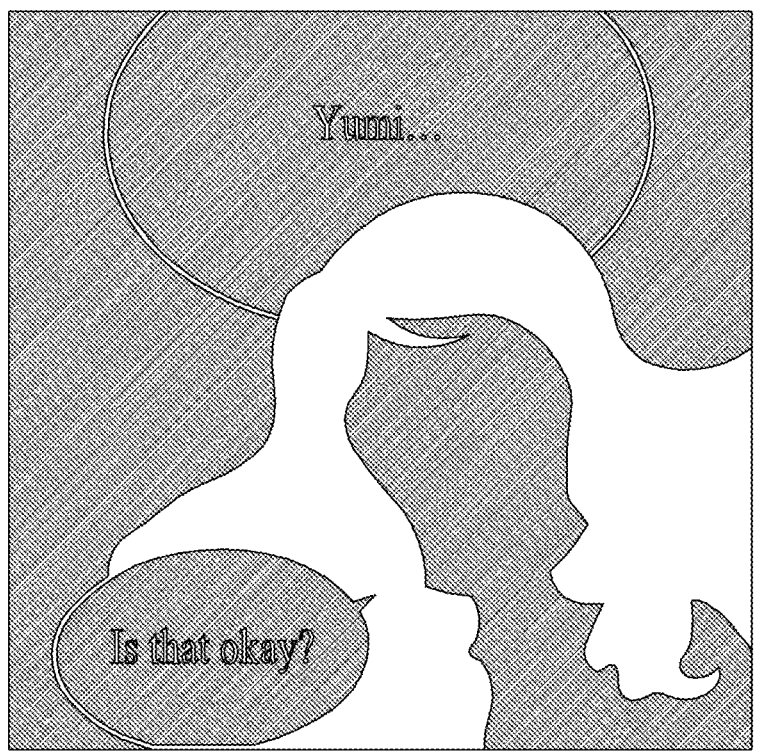
FIG. 5D illustrates an example of yet another target mask generated from the target image of FIG. 4 by the processor of FIG. 2 according to an example embodiment.
Figure 7C:
FIG. 7C illustrates an example of still another reference mask generated from the reference image of FIG. 6 by the processor of FIG. 2.
Figure 7D:
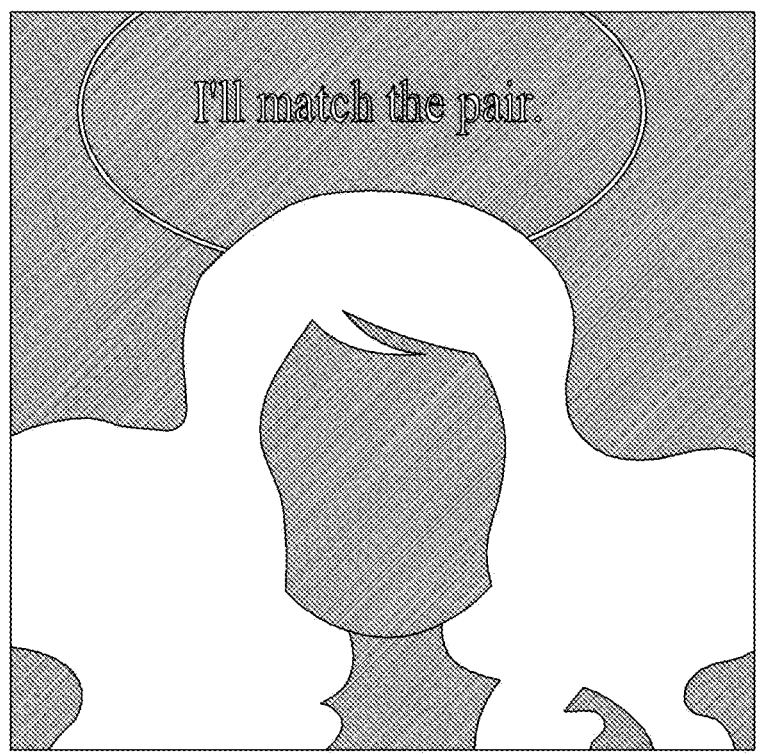
FIG. 7D illustrates an example of yet another reference mask generated from the reference image of FIG. 6 by the processor of FIG. 2.

Here, the processor 212 may generate a reference mask of FIG. 7C by referring to the target mask of FIG. 5C that includes the speech bubble area and may generate a reference mask of FIG. 7D by referring to the target mask of FIG. 5D that includes the hair area.

Here, the reference masks of FIGS. 7A to 7D are provided as an example only and the number of reference masks and the detailed shapes thereof are not limited thereto. Accordingly, in addition to the reference masks described in FIGS. 7A to 7D, the processor 212 may further generate a mask that includes a facial area and a mask that includes a torso area.

The processor 212 according to an example embodiment may generate at least one colored target mask by coloring each of at least one target mask by referring to a color of at least one reference mask.

To this end, the processor 212 according to an example embodiment may determine a representative color of an area included in the reference mask according to a predetermined scheme.

As described above, the "mask" such as the reference mask includes at least a partial area of an original image and thus, includes information regarding whether each of a plurality of points constituting the original image is included in a corresponding mask.

Therefore, the processor 212 may determine a representative color of an area included in the corresponding reference mask as a color of the reference mask by referring to the reference mask and the reference image together.

For example, by referring to an area included in the first reference mask of FIG. 7A, the processor 212 may determine the average color of a corresponding area in the reference image of FIG. 6 as the representative color of the area included in the first reference mask, that is, the color of the corresponding reference mask. The average color means the average value of colors included in the corresponding area in the image.

Also, by referring to an area included in the second reference mask of FIG. 7B, the processor 212 may determine the average color of a corresponding area in the reference image of FIG. 6 as the representative color of the area included in the second reference mask (i.e., the color of the corresponding reference mask).

The processor 212 may generate a colored target mask by determining the representative color determined through the aforementioned process as the color of the target mask corresponding to the corresponding reference mask. That is, the processor 212 may generate the colored target mask by coloring each target mask with the color of a reference mask corresponding to each target mask.

Figure 8:
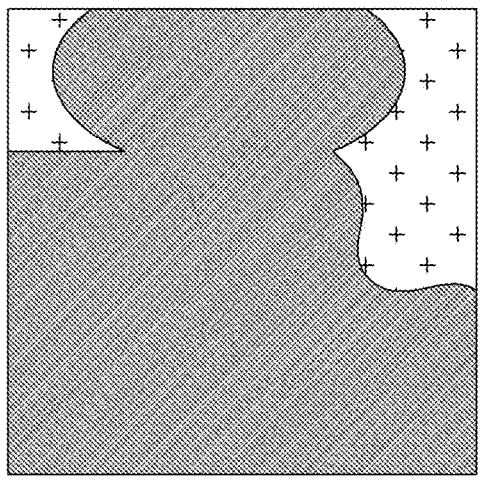
FIG. 8 illustrates examples of colored target masks.
Figure 8:
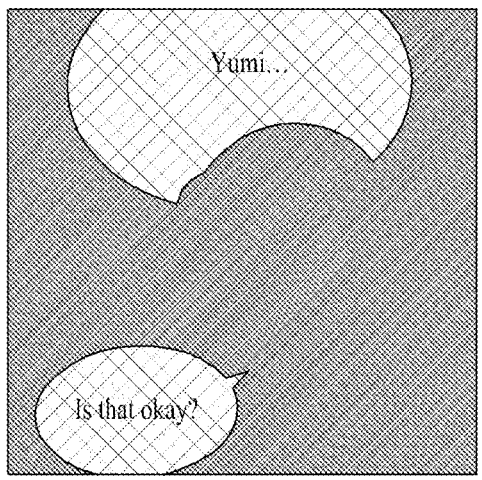
Figure 8:
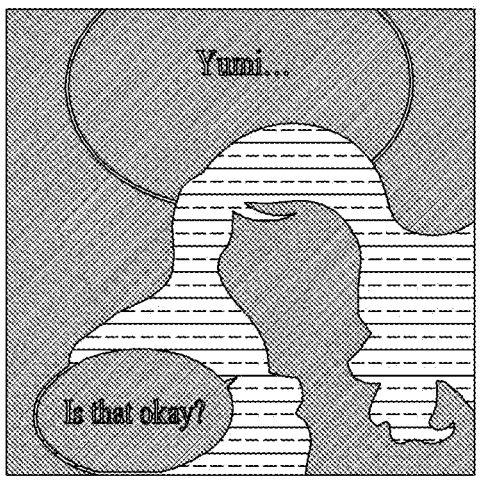

FIG. 8 illustrates an example of a colored target mask.

As described above, by referring to the area included in the first reference mask of FIG. 7A, the processor 212 may determine the average color of a corresponding area in the reference image of FIG. 6 as the representative color of the area included in the first reference mask. Also, taking into consideration of the correspondence relationship between the reference mask and the target mask, the processor 212 may generate the colored target mask of FIG. 8 by coloring the first target mask of FIG. 5A with the determined representative color.

In the same manner, the processor 212 may generate the colored target mask of FIG. 8 by coloring each of the target masks of FIGS. 5B, 5C, and 5D with each corresponding determined representative color. The colored target masks may be used by the processor 212 to generate the colored target image.

Using the trained second artificial neural network, the processor 212 according to an example embodiment may generate the colored target image from the target image, at least one target mask, and at least one colored target mask.

As described above, the second artificial neural network may be a neural network trained to generate the colored target image from at least one colored target mask by referring to the target image to be colored and at least one target mask generated from the target image. That is, the second artificial neural network may be a neural network trained to generate the colored target image from at least one colored target mask.

The processor 212 may generate the colored target image by merging at least one colored target mask using the second artificial neural network and, here, may generate the colored target image by applying a predetermined image effect to at least one colored target mask.

Here, the predetermined effect image may refer to an effect that causes a color difference between pixels included in each of the at least one colored target mask and adjacent pixels to be less than or equal to a predetermined threshold difference. The image effect may be to improve the completeness of the colored target image by reducing an unnatural part (e.g., a boarder generated due to checkerboard artifacts) included in an image generated by the second artificial neural network or unnatural parts caused by merging the plurality of masks.

Figure 9:
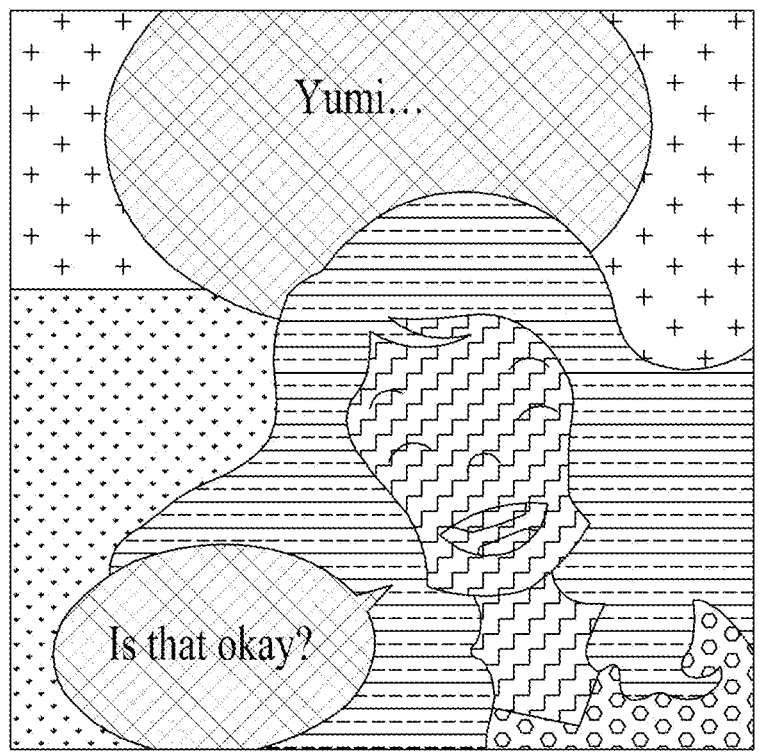
FIG. 9 illustrates an example of a colored target image.

FIG. 9 illustrates an example of a colored target image.

Comparing the reference image (FIG. 6) and the target image, corresponding areas in the target image and the reference image may be colored with the same color by the first artificial neural network and the second artificial neural network.

In this manner, example embodiments may perform coloring which is more suitable to the needs of a user by performing automatic coloring of an image based on a provided reference image, and may reduce work time required in making corrections by the user.

Figure 10A:
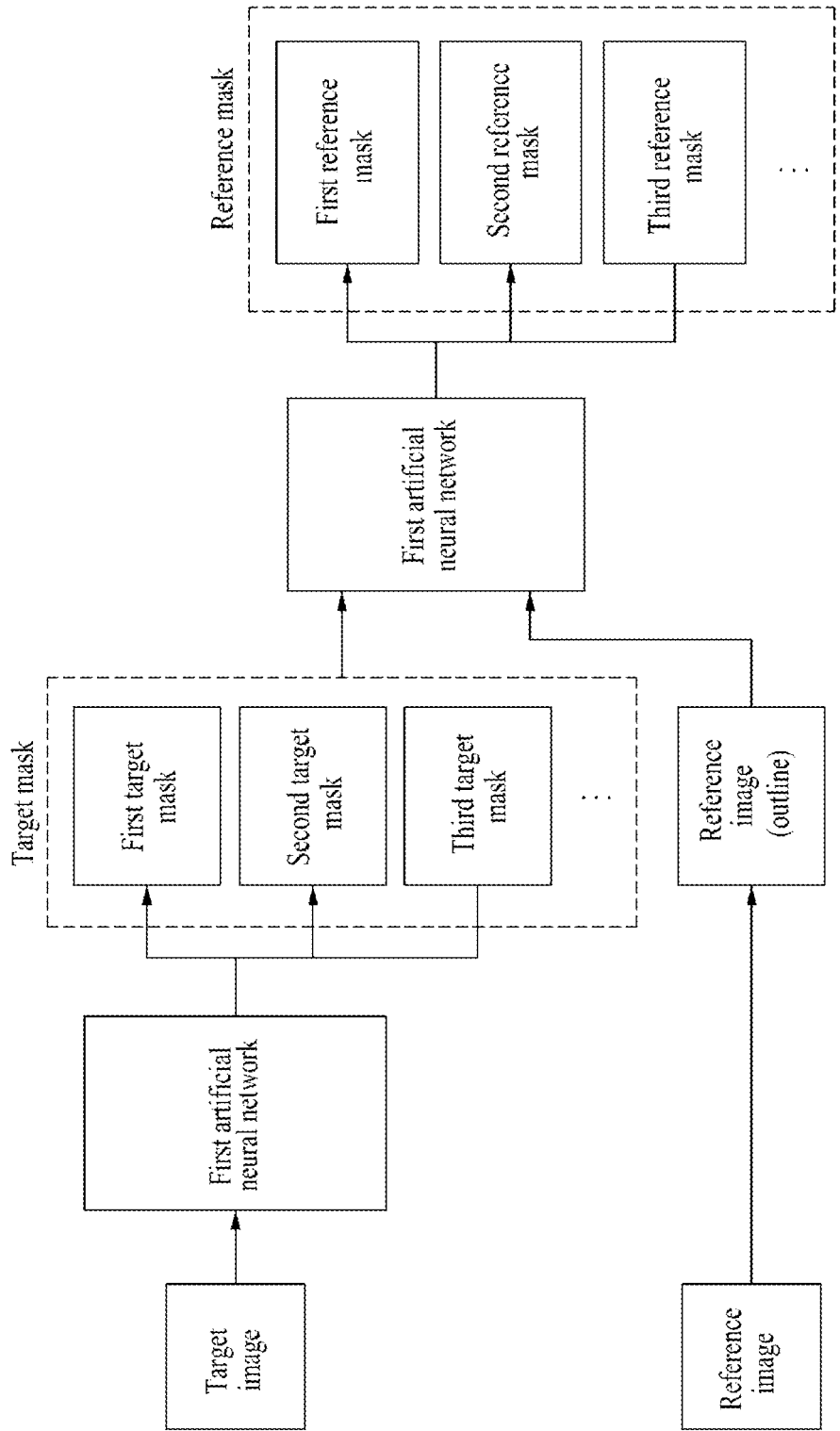
FIG. 10A illustrates a process of generating, by the processor of FIG. 2, a colored target image.
Figure 10B:
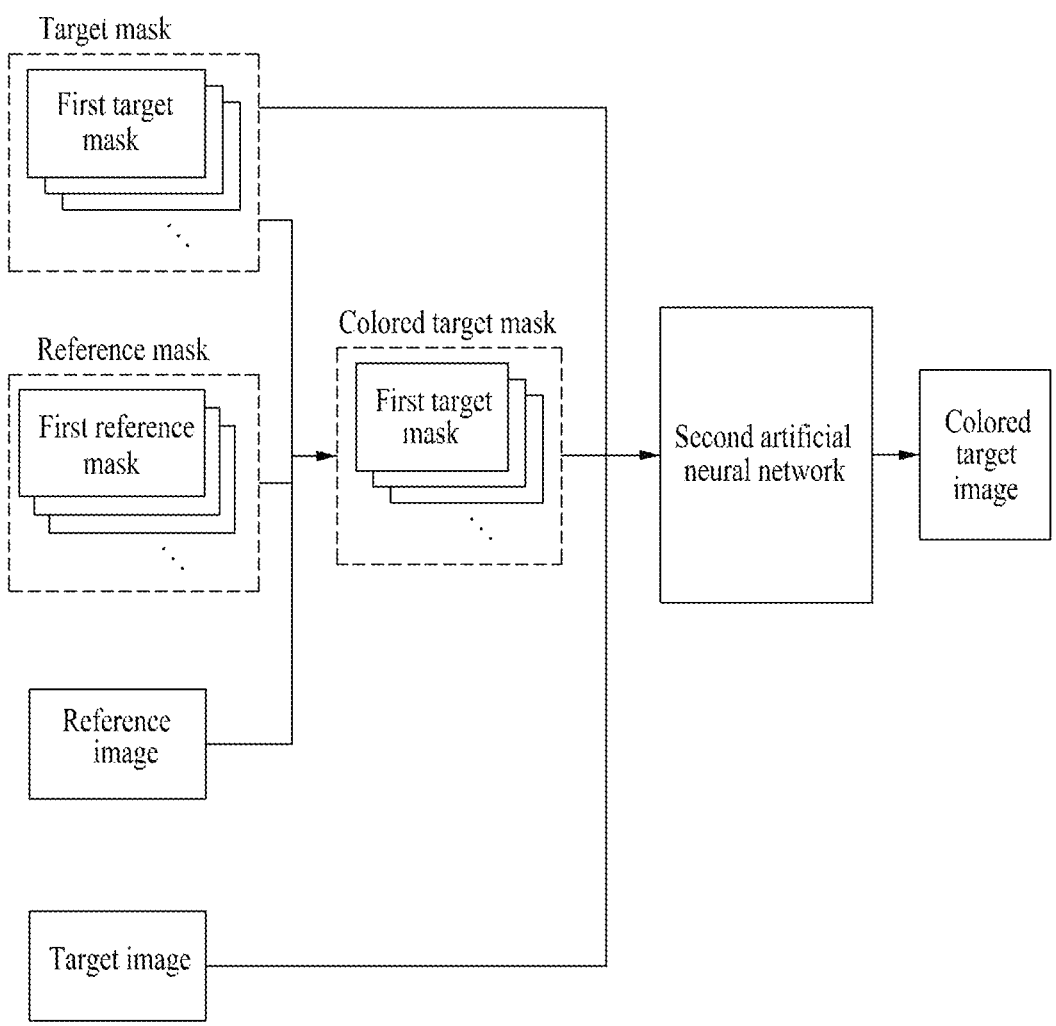
FIG. 10B illustrates a process of generating, by the processor of FIG. 2, a colored target image.

Hereinafter, a process of generating, by the processor 212, a colored target image is again described with reference to FIGS. 10A and 10B.

The processor 212 according to an example embodiment may generate at least one target mask (FIGS. 5A to 5D) from the target image (FIG. 4) using the first artificial neural network.

The processor 212 according to an example embodiment may generate a reference image in which coloring is removed (i.e., an image in which only an outline remains) from the reference image (FIG. 6). The processor 212 may generate at least one reference mask (FIGS. 7A to 7D) from the reference image in which coloring is removed using the first artificial neural network. Here, by referring to the at least one target mask (FIGS. 5A to 5D) generated in advance, the processor 212 may generate the at least one reference mask (FIG. 7A to FIG. D) to correspond to at least one target mask (FIGS. 5A to 5D), respectively.

The processor 212 may generate at least one colored target mask by referring to the at least one target mask, the at least one reference mask, and the reference image generated through the aforementioned process.

Here, the processor 212 may color each target mask based on the average color on a reference image of an area (partial area of the reference image) included in a reference mask corresponding to each target mask.

Using the second artificial neural network, the processor 212 according to an example embodiment may generate a colored target image from at least one colored target mask generated through the aforementioned process, at least one target mask, and the target image.

Accordingly, the example embodiments may generate an automatically colored target image in a similar style to that of a reference image provided with a target image.

Figure 11:
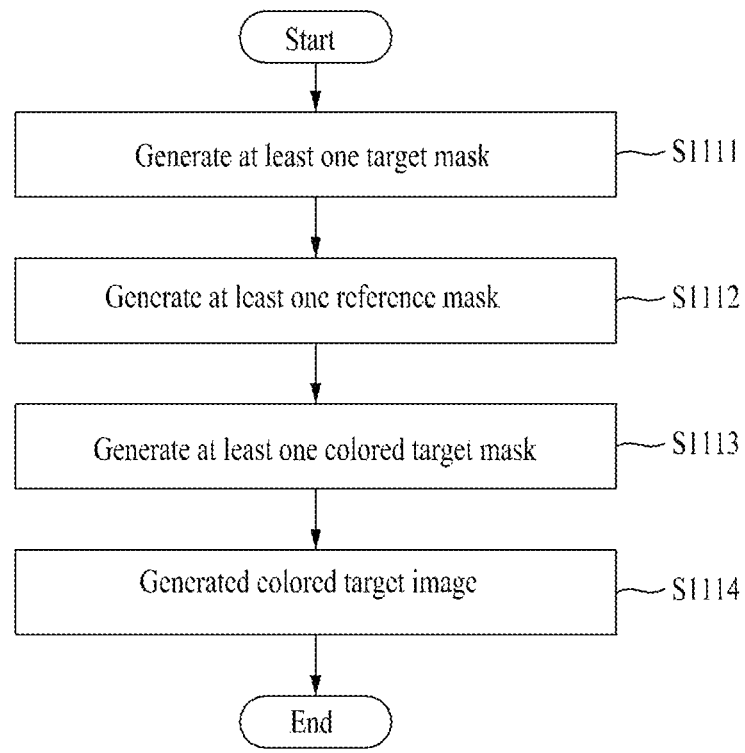
FIG. 11 is a flowchart illustrating a method of coloring a target image by the server of FIG. 2 according to an example embodiment.

FIG. 11 is a flowchart illustrating a method of coloring a target image by the server 200 according to an example embodiment. Hereinafter, description is made also with reference to FIGS. 1 to 10B. Here, repeated description with respect to FIGS. 1 to 10B is omitted.

In operation S1111, the server 200 may generate at least one target mask that includes a partial area of a target image obtained using a trained first artificial neural network.

As described above, the first artificial neural network may be an artificial neural network trained to learn a feature about image segmentation using an original image and at least one mask obtained by segmenting the original image. Therefore, the server 200 may generate at least one target mask from the target image using the first artificial neural network. That is, the server 200 may obtain at least one target mask as an output by inputting the target image to the first artificial neural network.

For example, the server 200 according to an example embodiment may generate, from the target image of FIG. 4, a first target mask that includes an upper area of a background as illustrated in FIG. 5A.

Since the first artificial neural network generates a target mask based on a similarity of color to be used for coloring, areas included in a single target mask correspond to areas that may be colored with similar colors. Therefore, an area included in the mask of FIG. 5A (i.e., an area indicated in white) may correspond to an area that may be colored with a single color or a color similar thereto.

Likewise, the server 200 according to an example embodiment may generate, from the target image of FIG. 4, a second target mask that includes a lower area of the background as illustrated in FIG. 5B, a third target mask that includes a speech bubble area, and a fourth target mask that includes the hair area. Similar to the aforementioned first target mask, areas included on each mask may correspond to areas that may be colored with similar colors. Also, although not illustrated, the server 200 may further generate a mask that includes the facial area and a mask that includes the torso area in addition to the target masks described in FIGS. 5A to 5D.

In operation S1112, the server 200 according to an example embodiment may generate at least one reference mask that, respectively, corresponds to at least one target mask generated through the aforementioned process and includes at least a partial area of the obtained reference image, using the trained first artificial neural network.

As described above, the first artificial neural network refers to a neural network trained to generate at least one mask by segmenting an input image into a plurality of areas and may be a neural network trained to generate a mask by segmenting input image into the plurality of areas by referring to input masks (i.e., input target masks) as well as a similarity of color to be used for coloring. Therefore, the server 200 may generate at least one reference mask from a reference image and at least one target mask using the first artificial neural network. That is, the server 200 may obtain at least one reference mask as an output by inputting the reference image and at least one target mask to the first artificial neural network.

The server 200 according to an example embodiment may generate a first reference mask that includes an upper area of a background as illustrated in FIG. 7A from the reference image of FIG. 6 by referring to the target mask of FIG. 5A that includes an upper background area of the target image (FIG. 4).

Likewise, referring to FIG. 7B, the server 200 may generate a second reference mask that includes a lower area of the background from the reference image of FIG. 6 by referring to the target mask of FIG. 5B that includes the lower area of the background.

Here, the server 200 may generate a reference mask of FIG. 7C by referring to the target mask of FIG. 5C that includes the speech bubble area and may generate the reference mask of FIG. 7D by referring to the target mask of FIG. 5D that includes the hair area.

Here, the reference masks of FIGS. 7A to 7D are provided as an example only and the number of reference masks and the detailed shapes thereof are not limited thereto. Accordingly, in addition to the reference masks described in FIGS. 7A to 7D, the server 200 may further generate a mask that includes the facial area and a mask that includes the torso area.

In operation S1113, the server 200 according to an example embodiment may generate at least one colored target mask by coloring each of at least one target mask by referring to the color of at least one reference mask.

To this end, the server 200 according to an example embodiment may determine the representative color of an area included in the reference mask according to a predetermined scheme.

As described above, a "mask" such as a reference mask includes at least a partial area of an original image and thus, includes information regarding whether each of a plurality of points constituting the original image is included in a corresponding mask.

Therefore, the server 200 may determine the representative color of an area included in the corresponding reference mask as the color of the reference mask by referring to the reference mask and the reference image together.

For example, by referring to an area included in the first reference mask of FIG. 7A, the server 200 may determine the average color of a corresponding area in the reference image of FIG. 6 as the representative color of the area included in the first reference mask, that is, the color of the corresponding reference mask.

Also, by referring to an area included in the second reference mask of FIG. 7B, the server 200 may determine the average color of a corresponding area in the reference image of FIG. 6 as the representative color of the area included in the second reference mask (i.e., the color of the corresponding reference mask).

The server 200 may generate a colored target mask by determining the representative color determined through the aforementioned process as the color of the target mask corresponding to the reference mask. That is, the server 200 may generate the colored target mask by coloring each target mask with the color of a reference mask corresponding to each target mask.

As described above, by referring to the area included in the first reference mask of FIG. 7A, the server 200 may determine the average color of a corresponding area in the reference image of FIG. 6 as the representative color of the area included in the first reference mask. Also, taking into consideration of a correspondence relationship between the reference mask and the target mask, the server 200 may generate the colored target mask of FIG. 8 by coloring the first target mask of FIG. 5A with the determined representative color.

In the same manner, the server 200 may generate the colored target mask of FIG. 8 by coloring each of the target masks of FIGS. 5B, 5C, and 5D with each corresponding determined representative color. The colored target mask may be used by the server 200 to generate the colored target image.

In operation S1114, the server 200 according to an example embodiment may generate a colored target image from the target image, at least one target mask, and at least one colored target mask using the trained second artificial neural network.

As described above, the second artificial neural network may be a neural network trained to generate the colored target image from at least one colored target mask by referring to the target image to be colored and at least one target mask generated from the target image. That is, the second artificial neural network may be a neural network trained to generate the colored target image from at least one colored target mask.

The server 200 may generate the colored target image by merging at least one colored target mask using the second artificial neural network and, here, may generate the colored target image by applying a predetermined image effect to at least one colored target mask.

Here, the predetermined effect image may refer to an effect that causes a color difference between pixels included in each of the at least one colored target mask and adjacent pixels to be less than or equal to a predetermined threshold difference. The image effect may be to improve the completeness of the colored target image by reducing an unnatural part (e.g., a boarder generated due to checkerboard artifacts) included in an image generated by the second artificial neural network or unnatural parts caused by merging the plurality of masks.

Comparing the reference image (FIG. 6) referenced for coloring the target image and the target image (FIG. 9), corresponding areas in the target image and the reference image may be colored with the same color by the first artificial neural network and the second artificial neural network.

In this manner, example embodiments may perform coloring more suitable for the needs of a user by performing automatic coloring of an image based on a provided reference image and may reduce the work time required in making corrections by the user.

According to another example embodiment, the user terminal 100 may perform the method of FIG. 11 of coloring the target image. That is, the method of coloring the target image, which is described to be performed by the server 200 and/or the processor 212 of the server 200 with reference to FIGS. 1 to 11 may be performed by the user terminal 100 and/or the processor 112 of the user terminal 100.

In this case, the user terminal 100 may determine a target image and a reference image based on the input of the user and may generate at least one target mask that includes a partial area of the target image obtained using the trained first artificial neural network as described above in operation S1111.

Also, as described in operation S1112, the user terminal 100 may generate at least one reference mask that, respectively, corresponds to at least one target mask generated through the aforementioned process and includes at least a partial area of the obtained reference image, using the trained first artificial neural network.

Also, as described in operation S1113, the user terminal 100 may generate at least one colored target mask by coloring each of at least one target mask by referring to the color of at least one reference mask.

Also, as described in operation S1114, the user terminal 100 may generate a colored target image from the target image, at least one target mask, and at least one colored target mask using the trained second artificial neural network. Further description related to operations S1111 to S1114 is omitted.

The apparatuses described herein may be implemented using hardware components, software components, and/or a combination of the hardware components and the software components. For example, the apparatuses and the components described herein may be implemented using one or more general-purpose or special purpose computers, such as, for example, a processing device including a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be permanently or temporarily embodied in any type of machine, component, physical equipment, virtual equipment, a computer storage medium or device, or a signal wave to be transmitted to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in the form of program instructions performed through various computer devices and recorded in non-transitory computer-readable media. The program instructions recorded in the media may be specially designed and configured for the example embodiments or may be known and available to those skilled in the computer software art. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Also, the media may be various types of recording devices or storage devices in a form in which one or a plurality of hardware components are combined. Without being limited to media directly connected to a computer system, the media may be distributed over the network. Examples of the program instructions include a machine code as produced by a compiler and a high-language code computer-executable using an interpreter. The hardware devices may be configured to operate as at least one software module to perform an operation of the example embodiments, or vice versa.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents. Therefore, other implementations, other example embodiments, and equivalents of the claims are to be construed as being included in the claims.

What is claimed is:

1. A method, executed by a processor, of coloring a target image using a colored reference image, the method comprising:
   generating at least one target mask that includes a partial area of the target image using a trained first artificial neural network;
   generating an outline image of the colored reference image by removing coloring from the colored reference image;
   generating, from the outline image of the colored reference image, at least one reference mask that corresponds to the at least one target mask, respectively, and includes at least a partial area of the colored reference image using the first artificial neural network;
   generating at least one colored target mask by coloring each of the at least one target mask by referring to a color of the at least one reference mask based on the at least one target mask, the at least one reference mask and the colored reference image; and
   generating a colored target image from the target image, the at least one target mask, and the at least one colored target mask using a trained second artificial neural network.

2. The method of claim 1, wherein the first artificial neural network is trained to segment the target image into at least one area based on a similarity of color to be used for coloring in each area and to generate the at least one target mask that includes each of the segmented at least one area.

3. The method of claim 2, wherein the at least one target mask includes information regarding whether each of a plurality of points constituting the target image is included in each of the at least one target mask.

4. The method of claim 2, wherein the first artificial neural network is trained to segment the colored reference image into at least one area based on a similarity of color to be used for coloring in each area and a shape similarity with an area included in the at least one target mask and to generate the at least one reference mask that includes each of the segmented at least one area.

5. The method of claim 4, wherein the at least one reference mask includes information regarding whether each of a plurality of points constituting the colored reference image is included in each of the at least one reference mask.

6. The method of claim 1, wherein the second artificial neural network is trained to generate the colored target image from the at least one colored target mask by referring to the target image and the at least one target mask.

7. The method of claim 6, wherein the second artificial neural network is trained to generate the colored target image from the at least one colored target mask by referring to the target image and the at least one target mask and to generate the colored target image by applying a predetermined image effect to the at least one colored target mask.

8. The method of claim 7, wherein the predetermined image effect is an effect that causes a color difference between pixels included in each of the at least one colored target mask and adjacent pixels to be less than or equal to a predetermined threshold difference.

9. The method of claim 1, wherein the generating of the colored target mask comprises:
   determining a representative color of an area included in a first reference mask according to a predetermined scheme; and
   generating the colored target mask by determining the representative color as a color of a target mask corresponding to the first reference mask.

10. The method of claim 9, wherein the predetermined scheme is a scheme of determining an average color of an area included in the first reference mask as the representative color.

11. A non-transitory computer readable recording media storing a program for instructing a processor to implement the method according to claim 1.

12. An apparatus for coloring a target image using a colored reference image, comprising:
   a processor,
   wherein the processor is configured to
   generate at least one target mask that includes a partial area of the target image using a trained first artificial neural network,
   generate an outline image of the colored reference image by removing coloring from the colored reference image;
   generate, from the outline image of the colored reference image, at least one reference mask that corresponds to the at least one target mask, respectively, and includes at least a partial area of the colored reference image using the first artificial neural network,
   generate at least one colored target mask by coloring each of the at least one target mask by referring to a color of the at least one reference mask based on the at least one target mask, the at least one reference mask and the colored reference image, and generate a colored target image from the target image, the at least one target mask, and the at least one colored target mask using a trained second artificial neural network.

13. The apparatus of claim 12, wherein the first artificial neural network is trained to segment the target image into at least one area based on a similarity of color to be used for coloring in each area and to generate the at least one target mask that includes each of the segmented at least one area.

14. The apparatus of claim 13, wherein the at least one target mask includes information regarding whether each of a plurality of points constituting the target image is included in each of at least one target mask.

15. The apparatus of claim 13, wherein the first artificial neural network is trained to segment the colored reference image into at least one area based on a similarity of color to be used for coloring in each area and a shape similarity with an area included in the at least one target mask and to generate the at least one reference mask that includes each of the segmented at least one area.

16. The apparatus of claim 15, wherein the at least one reference mask includes information regarding whether each of a plurality of points constituting the colored reference image is included in each of the at least one reference mask.

17. The apparatus of claim 12, wherein the second artificial neural network is trained to generate the colored target image from the at least one colored target mask by referring to the target image and the at least one target mask.

18. The apparatus of claim 17, wherein the second artificial neural network is trained to generate the colored target image from the at least one colored target mask by referring to the target image and the at least one target mask and to generate the colored target image by applying a predetermined image effect to the at least one colored target mask.

19. The apparatus of claim 18, wherein the predetermined image effect is an effect that causes a color difference between pixels included in each of the at least one colored target mask and adjacent pixels to be less than or equal to a predetermined threshold difference.

20. The apparatus of claim 12, wherein the processor is further configured to determine a representative color of an area included in a first reference mask according to a predetermined scheme, and generate the colored target mask by determining the representative color as a color of a target mask corresponding to the first reference mask.

21. The apparatus of claim 20, wherein the predetermined scheme is a scheme of determining an average color of an area included in the first reference mask as the representative color.

* * * * *